(12) United States Patent
Agarwal

(10) Patent No.: US 6,963,570 B1
(45) Date of Patent: Nov. 8, 2005

(54) METHOD AND APPARATUS FOR ADAPTIVE LOSS-LESS COMPRESSION OF CELL/PACKET HEADERS

(75) Inventor: Anil K. Agarwal, Gaithersburg, MD (US)

(73) Assignee: Comsat Corporation, Bethesda, MD (US)

( * ) Notice: Subject to any disclaimer, the term of this patent is extended or adjusted under 35 U.S.C. 154(b) by 0 days.

(21) Appl. No.: 09/462,894

(22) PCT Filed: Jul. 15, 1998

(86) PCT No.: PCT/US98/14196

§ 371 (c)(1),
(2), (4) Date: Jan. 18, 2000

(87) PCT Pub. No.: WO99/04522

PCT Pub. Date: Jan. 28, 1999

Related U.S. Application Data

(60) Provisional application No. 60/052,539, filed on Jul. 15, 1997.

(51) Int. Cl.[7] .......................... H04L 12/28; G06F 15/16
(52) U.S. Cl. ............................. 370/395.32; 370/310.2; 709/247
(58) Field of Search .................. 370/310.1, 310.2, 370/328, 329, 332, 465, 466, 477, 521, 395.1, 370/349, 395.32, 392; 709/247; 711/216–217

(56) References Cited

U.S. PATENT DOCUMENTS

| 5,271,010 | A | * | 12/1993 | Miyake et al. ............... 370/392 |
| 5,406,550 | A | * | 4/1995 | McTiffin ....................... 370/335 |
| 5,553,069 | A | * | 9/1996 | Ueno et al. ................... 370/315 |
| 5,572,548 | A | * | 11/1996 | Pirez et al. ................... 375/260 |
| 5,638,371 | A | * | 6/1997 | Raychaudhuri et al. .... 370/310.2 |
| 5,684,791 | A | * | 11/1997 | Raychaudhuri et al. .... 370/310.2 |
| 5,710,756 | A | * | 1/1998 | Pasternak et al. ........... 370/216 |
| 5,717,689 | A | * | 2/1998 | Ayanoglu ..................... 370/349 |
| 5,729,526 | A | * | 3/1998 | Yoshida ....................... 370/206 |
| 5,793,758 | A | * | 8/1998 | Penners ....................... 370/342 |
| 5,812,527 | A | * | 9/1998 | Kline et al. .................. 370/232 |
| 5,835,730 | A | * | 11/1998 | Grossman et al. .......... 709/247 |
| 6,002,692 | A | * | 12/1999 | Wills ........................... 370/465 |
| 6,064,649 | A | * | 5/2000 | Johnston .................... 370/310.2 |
| 6,111,871 | A | * | 8/2000 | Chen et al. .................. 370/349 |
| 6,122,279 | A | * | 9/2000 | Milway et al. .......... 370/395.32 |

FOREIGN PATENT DOCUMENTS

| EP | 537743 A1 | * | 4/1993 | ........... H04L 12/56 |
| WO | WO 9716006 | * | 5/1997 | |

OTHER PUBLICATIONS

Raychaudhuri, WATMnet: protocol type wireless ATM system for multimedia personnal communication, 1996, IEEE, pp. 469-477.*

(Continued)

Primary Examiner—Steven Nguyen
(74) Attorney, Agent, or Firm—Sughrue Mion, PLLC

(57) ABSTRACT

An apparatus for compressing the header of ATM cells in order to provide greater bandwidth includes means for discriminating cells/packets (1310), means for detecting header (1320), means for compressing header (1330), means for combining compressed header with payload (1350), means for discriminating compressed header cell/packet (1710), means for detecting header in compressed header and separating header from payload (1720), means for decompressing header (1730), and means for combining decompressed header with payload (1740) to form cell/packets.

18 Claims, 14 Drawing Sheets

OTHER PUBLICATIONS

Raychaudhuri, WATMnet: protocol type wireless ATM system for multimedia personnal communication, 1997, IEEE, pp. 83-95.*

Raychaudhuri, ATM Based trnasport Architecture for multiservices wireless personnal communication, 1992, IEEE, pp. 1401-1414.*

Raychaudhuri, wirelessATM networks architecture, system design and prototyping, 1996, IEEE, pp. 42-49.*

Rob van engelshoven, ATM for military communications, 1995, IEEE, pp. 217-223.*

* cited by examiner

METHOD AND APPARATUS FOR ADAPTIVE LOSS-LESS COMPRESSION OF CELL/PACKET HEADERS

BACKGROUND OF THE INVENTION

The present application is based on U.S. provisional application Ser. No. 60/052,539 filed on Jul. 15, 1997 and priority therefrom is claimed under 35 U.S.C. §120. The entire content of Provisional Application Ser. No. 60-052,539 is incorporated herein by reference.

FIELD OF THE INVENTION

The present invention relates to the efficient and reliable transmission of packet or cell-based information, such as frame relay, Internet or asynchronous transfer mode (ATM)-based information, via wireless links. More specifically, the present invention relates to a method and apparatus for compressing and decompressing the headers of ATM cells or of segmented packets (Spackets) in order to provide additional capacity within ATM frames or Spacket frames for error correction and the like. While the present invention is applicable all of the foregoing and other similar types of cell or packet-based transmission formats, the ATM format will be the exemplary focus of one preferred embodiment for purposes of providing an enabling disclosure, written description and best mode for the present invention.

Asynchronous Transfer Mode (ATM) is a method for transmitting information via a broadband Integrated Services Digital Network (B-ISDN). This mode was originally investigated by a group called the International Telephone and Telegraph Consultative Committee (CCITT). The group, currently called the International Telecommunication Union—Telecommunications Standards Sector (ITU-TSS), investigated a new form of ISDN that would have the flexibility to accommodate a large number of channels and the ability to transfer large amounts of data at a very fast rate. At the end of the study, the committee decided to adopt ATM as the target transfer mode for the B-ISDN. The ITU-TSS is currently defining the wide area network (WAN) standards for ATM.

ATM is a transfer mode that sends 53 octet-sized packets of information across a network from one communication device to another. The 53 octets are assembled as a "cell", which comprises 48 octets of data information, referred to as the "payload", and 5 octets of "header" information (including the routing information). The header and data information must be organized into cells so that when the cells are filled, they can be sent when an open slot of 53 octets becomes available.

There are two forms of headers that are specified in the CCITT Recommendation I.361. Each form is 5 octets long. There also are two different ATM network connections, each one having a different type of header. One connection form is the user-network interface (UNI), which is used between the user installation and the first ATM exchange and also within the user's own network. The other form of connection is the network-node interface (NNI) which is used between the ATM exchanges in the trunk network. The header format for the UNI consists of the following fields:

Generic flow control (GFC) field of 4 bits. It can provide flow control information towards the network from an ATM endpoint.

Routing field of 24 bits. Eight of the bits are VPI (virtual path identifiers) and 16 bits are VCI (virtual channel identifier). Empty cells with both the VCI and VPI set to zero indicates that the cell is unassigned.

Payload type (PT) field of 3 bits. This field is used to provide information on whether the cell payload contains user information or network information. This field is used by the network to intercept any important network information.

Cell loss priority (CLP) field containing 1 bit. This field may be set by the user or service provider to indicate lower priority cells. If the bit is set to 1 the cell is at a risk of being discarded by the network during busy times.

Header error control (HEC) field of 8 bits. This field is processed by the physical layer to detect errors in the header. The code used for this field is capable of either single-bit error-correction or multiple-bit error-detection.

As seen in FIGS. 1A and 1B, the header format for the NNI is the same as the header information of the UNI except that there is no GFC, and the VPI of the routing field is 12 bits instead of 8 bits.

Error detection occurs only within the header message. No error detection of the data occurs within the information portion of the cell. The receiving endpoint determines whether the data can be corrected or whether it must be discarded. When a link or node becomes busy, an ATM network must discard cells until the problem is resolved. The first cells to be discarded are the cells that have a CLP bit in the header set to a "1". Since connection endpoints are not notified when a cell is discarded, higher layers of protocols are needed to detect and recover from errors.

Although ATM-based transmission, switching, and network technology has been employed in broadband integrated services digital networks (B-ISDN) which rely on fiber optics, there are numerous difficulties associated with implementing ATM based technology in a wireless communication network. These difficulties include the fact that ATM-based networks and switches rely on a number of high-speed interfaces. These high-speed standard interfaces include OC-3 (155 Mbit/s), OC-12 (622 Mbit/s) and DS3 (45 Mbit/s). However, a few ATM based networks and switches support lower speed interfaces, such as T1 (1.544 Mbit/s) and the programmable rate RS-449 interface.

As a consequence, there are only a few interfaces which can support the comparatively low transmission rates (less than 1 Mbit/s to 8 Mbit/s) used in wireless communication. Although commercial satellite and wireless modems support these low transmission rates using an RS-449 programmable rate interface, it is difficult to implement ATM based technology in a wireless environment using conventional interfaces because most ATM traffic is transmitted over high rate data interfaces.

Another difficulty associated with implementing ATM based technology in a wireless communication network has to do with the fact that ATM based protocols rely on extremely low bit error ratios which are typical of fiber optics based networks. By way of example, ATM protocols assume that the transmission medium has very low Bit Error Ratios (BER) ($10^{-12}$) and that bit errors occur randomly.

In contrast, the bit error ratios associated with wireless communication are much higher (on the order of $10^{-3}$ to $10^{-8}$) and tend to fluctuate in accordance with atmospheric conditions. In addition, the errors associated with wireless communication tend to occur in longer bursts. Thus, a robust error correction scheme must be employed in a wireless network in which ATM based technology is to be implemented.

In addition to the difficulties discussed above; there is another significant constraint placed on wireless communication networks which is not imposed on terrestrial based fiber optics networks. This constraint has to do with the fact that the cost of bandwidth in a wireless network is much higher than for fiber optics networks. As a consequence of having been traditionally implemented in fiber optics networks, ATM based technology is not particularly efficient in its use of transmission bandwidth. Therefore, if ATM-based technology is to be implemented in wireless networks, it must achieve a more efficient use of bandwidth.

Other primary access interfaces include "frame relay" (for LAN interconnection and Internet access) using TCP/IP or other LAN protocols. Considerations similar to those for ATM are relevant to the transmission of traffic using these other interfaces, as exemplified by the transmission of frame/relay traffic over satellite/wireless networks, although some differences are known in the art.

For example, unlike ATM cells, frame relay packets are variable lengths. Thus, the frame formats used to communicate between the satellite/wireless terminals are arranged to transport variable length packets efficiently.

As explained in the Provisional Application Ser. No. 60-052,359, which is incorporated herein by reference, the frame/relay uses a robust, flexible frame format between two communicating terminals which allows the transport of several variable sized Spackets (segmented packets) in a frame and also allows a single Spacket to be carried over several frames, whichever the case might be. Also, the frame format allows fast synchronization and the exchange of coding information. Each frame contains Reed-Solomon (RS) check bytes that are used for error correction and to enhance the quality of the satellite/wireless link. The number of RS check bytes in a frame can be changed on the fly, without any loss of data, to compensate for varying link conditions. The decision to change the RS check bytes in a frame is based on the constant monitoring of the link quality. Several frames are also interleaved before transmission over the satellite/wireless link, to help spread the effect of burst errors over several frames, all of which can then be corrected by the FEC in the frames.

Also, Virtual Channels (VCs) can be configured to be enabled for data compression, which means that the Spackets belonging to the VC are passed through a data compressor/decompressor combination to save bandwidth. VCs can also be configured to be either high or low priority VCs and the scheduler then, uses this information to fairly transmit the various Spackets over the satellite/wireless link. To minimize the large delays introduced by the transmission of low priority packets on a low bit rate link, and the delay experienced by high priority packets which are waiting to be scheduled, the Spacket allows the segmentation of large packets into several, smaller Spackets. The delays experienced by high priority packets are substantially reduced. This also allows for efficient implementation of the compression and decompression modules.

The frame relay arrangement using Spackets also faces the problem of efficiently-using bandwidth in a wireless network. Therefore, if frame relay (Spacket)-based technology is to be implemented in wireless networks, it must achieve a more efficient use of bandwidth. These same goals apply to Internet transmissions and those generally using TCP/IP protocols. However, no solution to problems blocking achievement of these goals is seen in the prior art.

U.S. Pat. No. 5,568,482 relates to a low speed radio link system and method designed for ATM transport. The system is based on a data protocol which is compatible with non-wireless ATM based data transmission systems. The data protocol incorporates a frame format which allows for the transmission of ATM cells in low speed, high noise links. However, the data protocol is rigid and does not account for partial or compressed cells. Similarly, the reference fails to accommodate flexible data payloads or flexible block codes for error correction.

There exists one scheme for packet header compression in the TCP/IP suite of protocols, as disclosed in V. Jacobson, RFC 1144, "Compressing TCP/IP headers for low-speed serial links", Feb. 1, 1990. It is intended for use over slow speed serial links (less than 64 Kbit/s). The Jacobsen reference specifies a header compression algorithm used for compressing TCP/IP headers. That scheme applies only to TCP/IP packets; it generates variable sized compressed headers; it requires a fair amount of computational power to implement; it requires bi-directional traffic for every TCP connection.

While ATM systems were known prior to the present invention, no systems are known to have previously transported frame relay packets over satellite/wireless links, using the Spacket format. Traditionally, frame relay traffic has been transported over satellite/wireless links by directly connecting frame relay switches to satellite/wireless modems without the processing of Spackets as described herein.

SUMMARY OF THE INVENTION

The present invention overcomes the above-mentioned problems associated with implementing cell or packet-based technology in a wireless communication network by providing a frame format for a communication signal containing a bit stream, such as one including asynchronous transfer mode (ATM) formatted data.

The present invention also overcomes the above-mentioned problems associated with implementing frame relay-based technology in a wireless communication network, carrying frame relay or Internet-formatted data supported by TCP/IP and other LAN protocols, by providing a frame format for a communication signal containing a bit stream including Spacket formatted data.

As to use in the ATM environment, the invention concerns a portion of the ATM Link Accelerator (ALA), which is located between the ATM switch and the WAN transmission device. The ALA design is based upon an architecture and frame structure which encompasses adaptive rate interfaces, Reed-Solomon coding and decoding, interleaving and deinterleaving, and frame assemble/disassemble functions. Improvements are also made in adaptive coding, frame synchronization, head compression and data compression.

A particular problem which the present invention overcomes is the inefficient use of available bandwidth. ATM technology uses small size cells (53 octets), each having 5 octets that are used as a header to provide a header-error-correcting checksum and virtual path (VP) and virtual circuit (VC) ID numbers and control. The present invention saves two octets of the ATM header when transmitted over wireless/satellite links and provides approximately a 4% increase in available bandwidth to users.

The invention uses an algorithm which replaces four of the octets in the ATM header with two octets when the cell is transmitted over a communication link. This reduction is possible because, in theory, only a small subset of all possible virtual paths/virtual channel-connections are made.

A further feature of the invention is that it uses a header compression algorithm which is based upon a look-up table and uses hashing or tree look-up techniques for efficiently searching the table to identify a 2-octet header that can replace a 4-octet header. A similar decompression algorithm is used at the receiver.

Accordingly, it is an object of the present invention to provide an ALA ATM Header Compression Algorithm (ALA-AHCA) that offers approximately a 4% increase in bandwidth to user applications.

It also is an object of the present invention to apply the same principles of header compression to the header of Spackets in frame relay systems which have large variable size packets of information.

It is a further object of the present invention to provide an algorithm that results in a fixed size compressed header, instead of a variable size header, which facilitates high performance implementation in hardware and/or software.

It is another object of the present invention to provide an algorithm that compresses the header for every cell or Spacket, including those with headers that have not been processed before.

Another object is to provided an algorithm that is simple and streamlined and can be implemented efficiently in software or hardware.

Yet another object is to provide an algorithm that is adaptive and loss-less, and is totally transparent to ATM or packet switches.

According to the present invention, the algorithm does not require any a priori knowledge of the configuration of Virtual Circuit Identifiers in use over the link.

Further, the algorithm does not impose any constraints on the range of Virtual Circuit Identifiers (VCIDs) or Virtual Path Identifiers (VPIDs) used by the system switches.

Also, as the ALA-AHCA for an ATM implementation or comparable Spacket header compression implementation does not require feedback from the receiver to the transmitter, it can be used on one-way links as well as two-way links. Moreover, the ALA-AHCA or comparable Spacket implementation automatically synchronizes the receiver to the transmitter, even if cells are lost over a wide area network (WAN) link.

As used herein, the term "cell" shall be used to mean a fixed size container, such as the ATM cell, and the term "packet" shall be used to mean and a variable size container, and the term "cell/packet" shall mean generically either or both such container arrangements.

BRIEF DESCRIPTION OF THE DRAWINGS

These and other features, aspects and advantages of the present invention will become better-understood with reference to the following description, appended claims, and accompanying drawings, in which:

DETAILED DESCRIPTION OF THE PREFERRED EMBODIMENTS

Figure 1A:
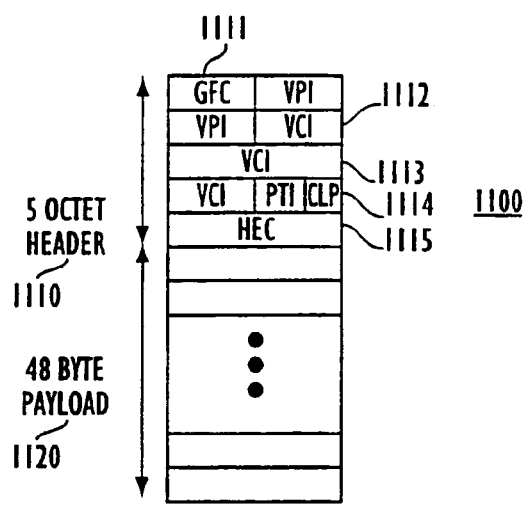
FIGS. 1A and 1B show an ATM cell structure having the UNI and NNI header formats, respectively.

In a preferred embodiment as disclosed herein, the subject matter of the present invention is embodied in one aspect of an ATM-based technology that is incorporated into an interface between conventional ATM-based technology and a wireless communication network. The interface facilitates the transmission of ATM-based traffic in a wireless communication network. However, the interface may also facilitate the transmission of ATM-based traffic over a terrestrial based network. Such interface is referred to as an ATM Link Accelerator (ALA). However, one of ordinary skill in the related art would recognize that similar structures would be applicable to frame relay transmission systems.

The present invention is described with respect to an ATM Link Accelerator (ALA) design that offers a way to interconnect ATM switches over satellites and wireless links, provide high quality of service for ATM applications, and offer efficient use of transmission link bandwidth. The ALA utilizes a method to interconnect standard ATM switches with interfaces, such as DS3 and E3—to—commercial satellite and wireless modems that support variable rates using an RS-449 programmable rate interface.

As disclosed in the Provisional Application, from which priority is claimed, the ALA includes forward error correction and interleaving so that ATM applications experience fiber-like quality over satellite and wireless links, whose bit error characteristics are much poorer than those of fiber. The ALA includes a number of features, such as a unique frame formatting technique that facilitates transmission of fixed sized and variable sized cells and packets, fast frame acquisition and synchronization method, adaptive coding, data compression to maximize user throughput over expensive satellite and wireless links.

The present invention specifically concerns an ALA Header Compression Algorithm (ALA-AHCA) that permits 4 octets of a standard 5-octet ATM cell header to be compressed to 2 octets before transmission over a link. With the use of this algorithm, the 4-octets of the cell header are faithfully regenerated at the receiver. This results in a savings of 2 octets per cell, providing approximately a 4% increase in bandwidth. The technique is such that it can be used over a wide variety of link types, including satellite, wireless and terrestrial links. The header compression is totally transparent to the end ATM equipment. The present invention is designed for high performance implementation in hardware or software. While ALA-AHCA is disclosed herein as being implemented in the ALA device, it can be implemented in a wide variety of other ATM equipment.

The present invention is directed to a method for modifying a frame format for a communication signal containing a bit stream including ATM formatted data. The present invention incorporates a method of compressing cell headers according to a predetermined lookup table content, and a method of decompressing the transmitted compressed cell headers using a similar lookup table processing.

Figure 2A:
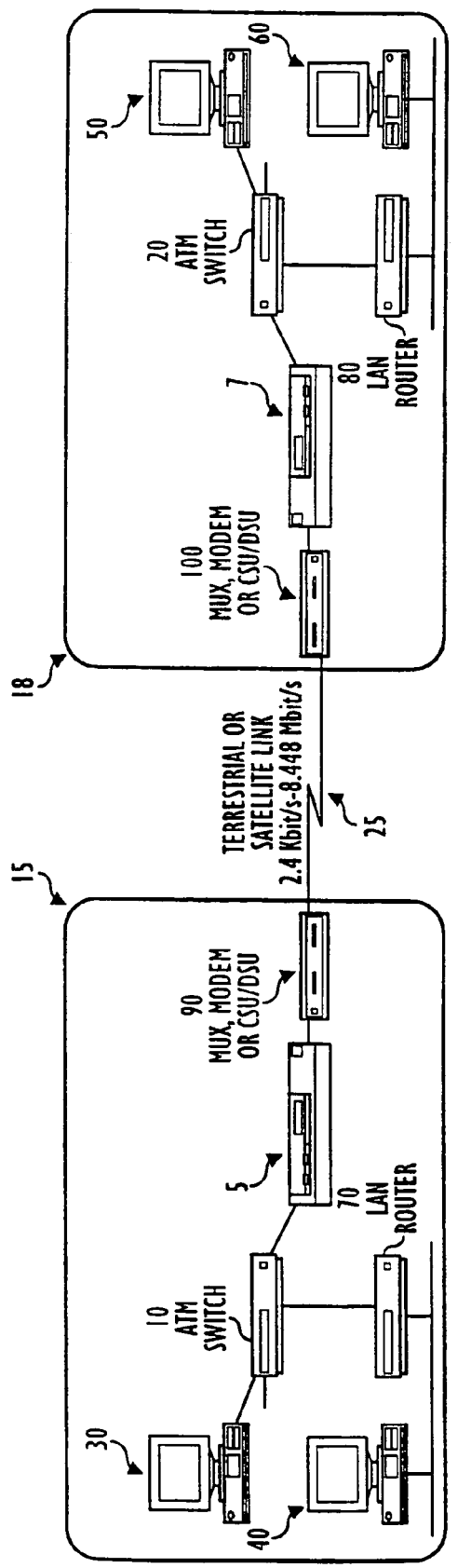
FIG. 2A shows an interface which implements the present invention.

FIG. 2A depicts a communication system involving two local area networks (LAN) 15 and 18 that are connected by a terrestrial or satellite link 25, each network having a respective interface 5 and 7 which provides a means of interconnecting a standard ATM switch 10 and 20 in each LAN over the terrestrial or satellite link 25. The interfaces are operative to provide high quality service for ATM-based applications and to provide an efficient use of transmission link bandwidth. In the illustrated application, the ATM switches 10 and 20 are connected to respective groups of computers (e.g., 30, 40 and 50, 60) directly or through LAN routers 70 and 80. The interfaces 5 and 7 may connect to the terrestrial or satellite link 25 via modems 90 and 100 which implement the RS-449 programmable rate interface mentioned previously. Alternatively, a multiplexer, a channel service unit (CSU) or a digital service unit (DSU) may be used instead of a modem.

Figure 2B:
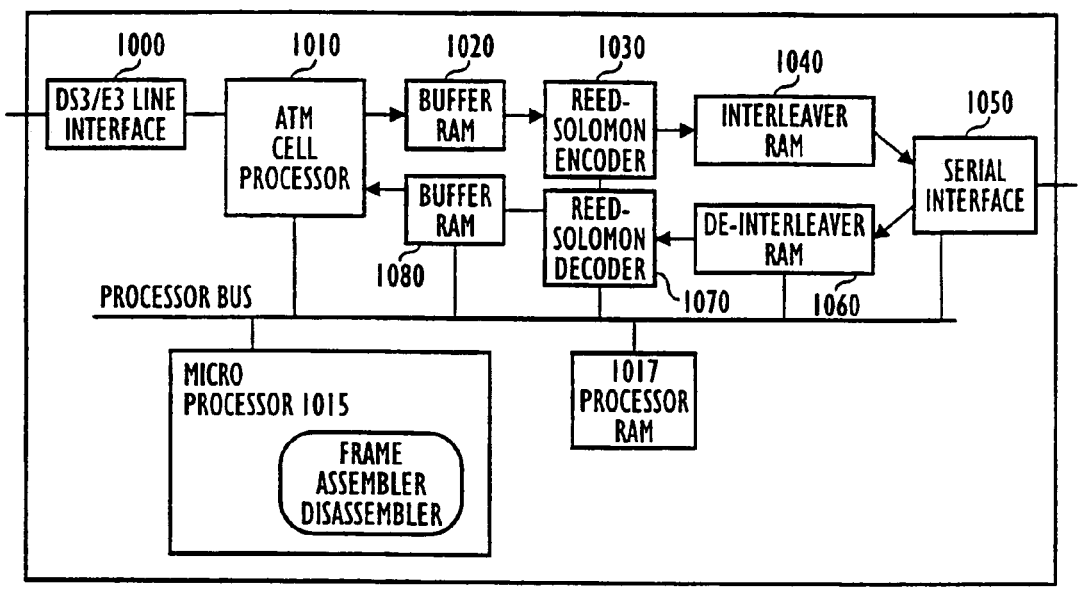
FIG. 2B shows a portion of an interface corresponding to the present invention.

The architecture and operation of an exemplary apparatus embodying the present invention is discussed below in connection with FIG. 2B. There, a DS-3/E3 Line Interface 1000 receives input data including ATM cells and/or packets from an ATM switch (10, 20; not shown in FIG. 2B). However, another line interface may be used to accommodate alternative standards. The ATM cell processor 1010 receives the ATM cells and/or packets from the interface 1000 and extracts a portion of any ATM cell received in order to determine whether errors are present within the header of the ATM cell. The ATM Cell Processor also applies the ALA-ATM Header Compression Algorithm (ALA-AHCA) to replace 4 octets of the header with a 2-octet code. The ATM Cell Processor 1010 then outputs the ATM cell (with a compressed error correction portion) and/or packet to a RAM Buffer 1020 under the control of a Microprocessor 1015 which is employed as the frame assembler of the present invention. A RAM 1017 is provided to support the operations of the Microprocessor 1015.

The Microprocessor 1015 forms frames in the manner described above. However, the data payload of each frame is stored in the RAM Buffer 1020. In addition, the Microprocessor 1015 appends a frame header to the data payload of each frame.

Subsequently, the frame header and the data payload of each frame are output from the RAM buffer 1020 to a Reed-Solomon Encoder 1030. The Reed-Solomon Encoder 1030 appends a number of check-bytes to each frame for error correction of the frame at a receiving apparatus.

An Interleaver RAM 1040 receives the output of the Reed-Solomon Encoder 1030 under the control of the Microprocessor 1015 in order to form an interleaved frame in the manner noted above and described in detail in the Provisional Application from which priority is claimed. Following the interleaving process, the interleaved frame is output by the Interleaver RAM 1040 to a Serial Interface 1050 for transmission to a receiving apparatus. The transmission may be made over a WAN via a modem, for example.

Each interface also is provided with components which are employed for the disassembly of transmitted frames. In particular, the interface embodying the present invention is provided with a Deinterleaver RAM 1060, which is used to deinterleave an interleaved frame. The deinterleaving operation occurs under the control of the Microprocessor 1015. Once an interleaved frame has been deinterleaved to provide individual frames, each individual frames is sent to a Reed-Solomon Decoder 1070, which removes the Reed-Solomon check-bytes and corrects any bit errors of the frame.

Subsequently, each of the corrected frames are output by the Reed-Solomon Decoder 1070 to a RAM Buffer 1080. The Microprocessor 1015, which is also employed as a disassembler of the present invention, disassembles each corrected frame output by the-Reed-Solomon Decoder 1070 and separates the data payload of each frame into its individual components (e.g. ATM cells and/or packets) in accordance with information provided in the frame header of the frame. The ATM cells and/or packets are then output via Buffer RAM 1080 to the ATM Cell Processor 1010 which appends error correction information to the header of each ATM cell. Specifically, the ATM Cell Processor 1010 also will apply an ALA-AHCA decompression algorithm, to substitute 4 octets of the header for the received 2-octet code. The ATM Cell Processor 1010 then outputs the ATM cell (with a decompressed error correction portion) and/or packet to a line interface 1000 for return of the ATM cells to the ATM switch for routing.

According to the present invention, ATM based cells are organized into frames which are suitable for wireless communication. However, the present invention is equally applicable to terrestrial based communication. Advantageously, the header and data portions of each cell may be separated and compressed so as to increase the effective bandwidth of the wireless communication link. Each frame can be efficiently packed with ATM cells and/or variable size packets which may be made up of compressed ATM cells. In addition, as required, only a portion of an ATM cell or variable size packet may be included in a frame, in order to provide optimal efficiency.

The frames are subsequently encoded in order to provide for the necessary error correction. According to one aspect of the present invention, adaptive coding can be employed by which the proper amount of forward error-correction is computed on a real-time basis in accordance with the number of bit errors detected in the receive link. Thus, if the quality of the received information is high, reduced bits can be allocated for data correction.

In this manner, the right amount of coding can be selected for the measured link quality and this information can be conveyed to a remote interface continuously. Once the remote interface receives this information, it can change the frame format to include fewer or more coding bytes as necessary for all subsequent transmitted frames.

Figure 1B:
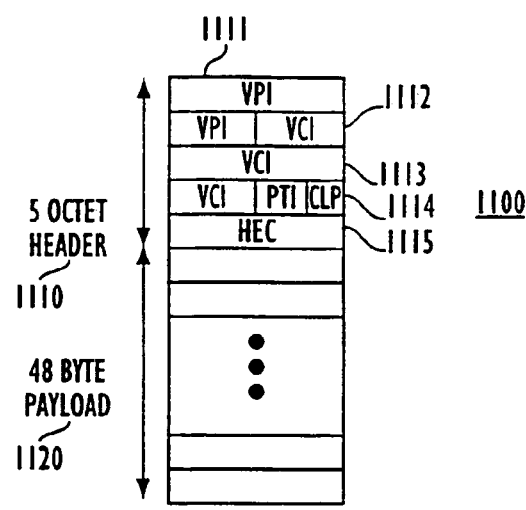
Figure 3:
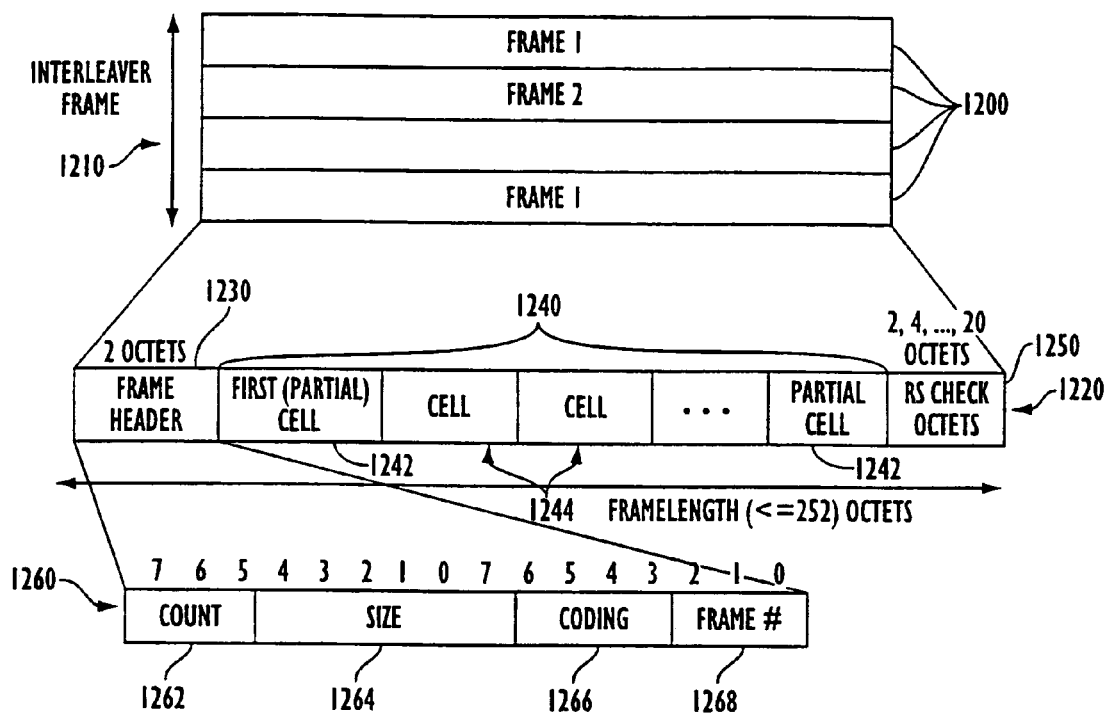
FIG. 3 shows an example of a frame formed for transmission of ATM cells and packets in accordance with the present invention.

The standard ATM cell formats that are relevant to the implementation of the present invention are illustrated in FIGS. 1A and 1B, and were previously explained. The standard frame format is seen in FIG. 3. With respect to the standard ATM cell format as seen in FIGS. 1A and 1B, the cell 1100 includes a header 1110, comprising five octets 1111–1115, and a payload 1120 comprising 48 octets 1121–1123. The five octets in the header include an HEC checksum, two virtual path identifiers (VPID) and two virtual circuit identifiers (VCID). In a conventional processing of a plurality of cells from an ATM switch, as previously noted, the headers are stripped from the cells and compressed, and the remaining data (without headers) for the plurality of cells is also compressed. The separated and compressed header and data components are provided into a frame format, as seen in FIG. 3, for transmission.

Each frame 1200 shown in FIG. 3 corresponds to a fundamental unit of transmission over the WAN link. Each frame 1200 is a fixed size frame, which is n octets long. If interleaving is utilized, then I frames are used to compose an "interleaved frame" 1210. An interleaving technique rearranges the order of the bytes in the interleaved frame and transmits each byte sequentially over a WAN link. There are no special synchronization bits employed within the frame structure.

An exemplary frame 1220 is n bytes long and includes a frame header 1230, a data payload 1240, and a block code 1250, as shown in FIG. 3B. The header 1230 is two-octets-long. The data payload 1240 has a variable length which depends on the size of the block code. As noted above, the data payload 1240 may contain a combination of partial or complete fixed-sized ATM cells 1242 and 1244 and variable-size packets (the packets, which are not shown, may contain one or more compressed ATM cells or some other data). The block code 1250 has a length which corresponds to a multiple of octets (e.g. block coding length=2t, where t>0. Advantageously, Reed-Solomon coding check-bytes may be provided as the block code 1250.

The above-mentioned frame header 1230 is made up of a number of fields. An exemplary frame header 1260 includes first through fourth fields 1262, 1264, 1266 and 1268. The first field 1262 contains the variable COUNT which defines the number of complete ATM cells in a frame, including any partial ATM cell which follows the complete ATM cells. The second field 1264 contains the variable SIZE which defines the space within the data payload that is allocated for a first partial ATM cell to be contained therein. By way of example, the variable SIZE may be set equal to the number of octets reserved for the first partial ATM cell divided by four.

A third field 1266 contains the variable FRAMENUM which defines the frame number. Frame numbers may range from 0–7 and repeat periodically.

Finally, a fourth field 1268 contains a variable CODING which defines aspects of the corresponding block code 1250 based on the frame number. By way of example, if the value of FRAMENUM is equal to zero, then the fourth field 1268 (or coding field) represents a suggested value of the number of octets which are to be reserved for the block code 1250. Advantageously, the block code 1250 may be generated in accordance with Reed-Solomon Coding. If Reed-Solomon Coding is employed then the coding field 1268 represents a suggested value of the number of Reed-Solomon octets divided by two that the transmitting interface should employ for its own transmissions.

Reed-Solomon Coding is implemented in the form of check-bytes which are generated by a standard Reed-Solomon algorithm based on the size of the frame in bytes and the number of check-bytes to be included within the corresponding frame.

If the receiving interface is not yet synchronized to its receiving bit stream, the coding field 1268 is set to a predetermined value (e.g. 0xF). The coding field 1268 cannot assume a value of zero, which corresponds to an invalid value.

If the value of FRAMENUM is equal to 1, then the least significant bit of the coding field 1268 is set to 1 to represent the fact that an ATM cell header compression algorithm has been activated. If the value of FRAMENUM is equal to 2 or 3, then the coding field 1269 may be set to zero.

If the value of FRAMENUM is greater than 3, then the coding field 1268 is set to a number which is a function of the number of block coding octets that the transmitting interface should use for its own transmissions starting with the next frame numbered zero.

The rules for filling each frame's data payload with ATM cells and packets are described in the Provisional Application from which priority is claimed.

After the complete ATM cells are included in the data payload, a number of variable-size packets may be provided therein. Each packet contains a length field which is 1-octet in length followed by the packet's contents. The value contained in the length field includes the length of the length field itself. For example, a packet having a length of 61 octets will begin with a length field of 62. If the last packet cannot be entirely contained in the data payload, then only its initial portion will be included therein. According to the present invention, the length field of a partial packet specifies the length of the entire packet.

If there are any octets left over in the data payload, then the first such unused octet shall contain a zero. The remainder of the octets, if any, shall be filled sequentially with the numbers i, i+1, i+2, . . . , where i is the octet number of the first such octet in the payload (octets in the payload are implicitly numbered 0, 1, . . . ).

Based on the above-mentioned rules, it is possible for the data payload of a frame to contain ATM cells only, packets only, or a combination of both. In addition, an ATM cell or packet may be split across more than two frames if either is larger than the size of the data payload. Moreover, the data payload size is unrelated to the size of an ATM cell or variable size packet. By way of example, the size of the data payload can be as small as two bytes.

The above-described frame structure allows for the possibility of dynamically changing the Reed-Solomon code size by correspondingly changing the data payload size but keeping the frame size constant. Such a scheme enhances the efficient use of the available transmission bandwidth.

Advantageously, if a receiving interface "loses" a frame, due to, for example, excessive bit errors in the frame, the variable SIZE can be used to rapidly determine an ATM cell or packet boundary in the very next frame.

Figure 4:
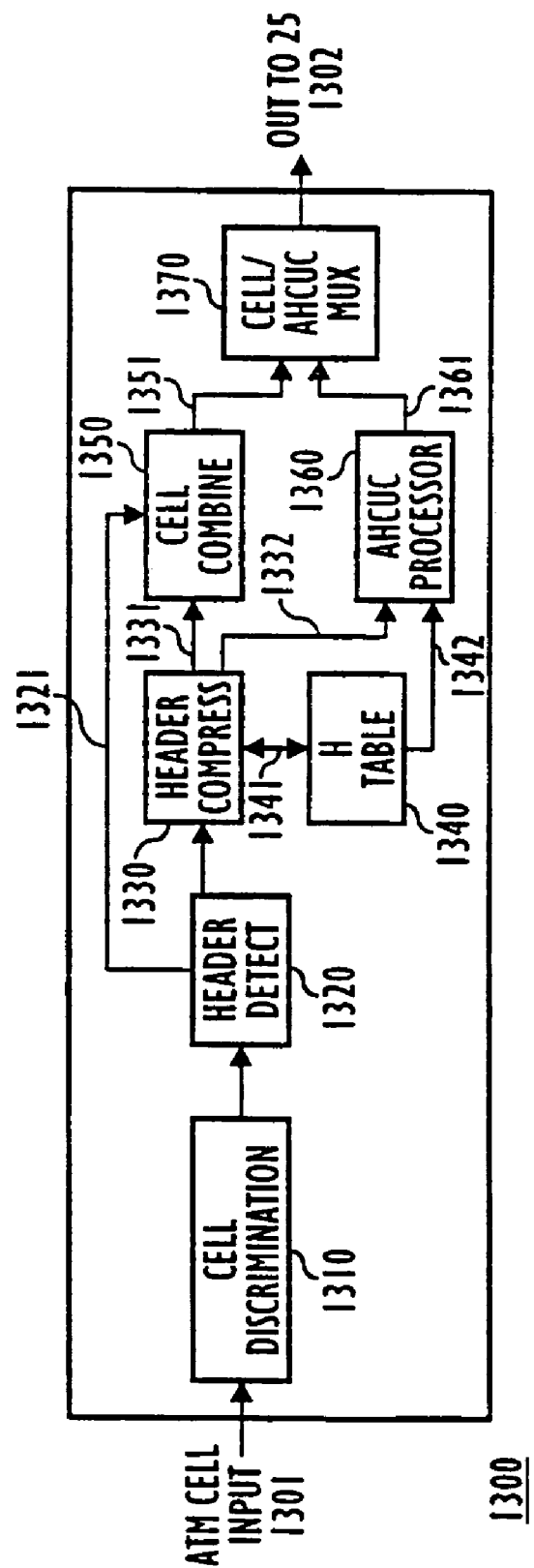
FIG. 4 shows a schematic illustration of circuit for compressing headers on ATM cells, in accordance with the present invention.

FIG. 4 illustrates a circuit 1300 within the ATM Cell Processor 1010 in FIG. 2 for processing ATM cells and compressing their headers prior to their assembly into a frame for transmission. A stream of ATM cells, each having the standard 53-octet structure, is applied to the input terminal 1301 and is first received by a cell discriminator 1310, where the cells are separated. The cells are then applied individually to a header detector 1320, which strips off the 48 octets of data and applies the data to line 1321. The output of the detector 1320 is the 5 octets of the cell header, which are applied to header compressor 1330. The head compressor 1330 will access the compression table 1340 via bi-directional line 1341 and will effect the conversion of 4 out of the 5 octets into an index comprising a 2-octet set.

As seen in FIGS. 1A and 1B, three octets in the standard header have information directed to the virtual circuit connections and two octets have information directed to the virtual path connections. Since only a small subset of all possible virtual paths and circuits may be connected, the 4-octet portion of the header that carries this information is a focus for the compression function. The fifth octet representing the HEC checksum is discarded and, thus, is unaffected. The compressed header, comprising only two octets (ignoring the HEC checksum), is sent via line 1331 to cell combiner 1350 where the data portion of the cell is also received from the header detector 1320 via line 1321. The data and compressed header are combined and forwarded via line 1351 to the cell multiplexer 1370. The AHCUC Processor 1360 is operative to determine if the H compression table does not have a 2-octet index that corresponds to the 4 octet set in the original ATM cell. If no corresponding value is identified, the AHCUC Processor 1360 generates a new corresponding index entry for the H-table and provides information about the new entry to the receiving cell processor. The information is transferred by use of a unique cell format (AHCUC), as subsequently described. The AHCUC cells and the ATM cells with compressed headers are forwarded to the multiplexer 1370, which outputs a stream of cells with compressed headers and AHCUC cells from ATM Cell-Processor port 1302. The stream will be forwarded to the buffer RAM 1020 in FIG. 2B prior to encoding, interleaving and transmission on line 25 of FIG. 2A.

Figure 5A:
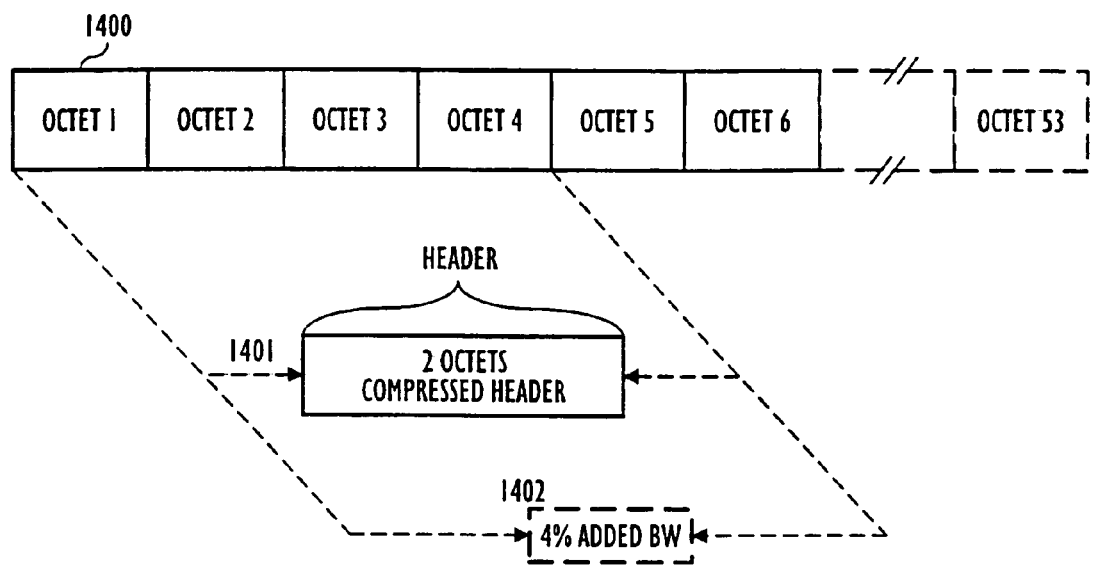
FIG. 5A is an illustration of an ATM cell and FIG. 5B is an illustration of a compressed header, in accordance with the present invention.

A representative illustration of the conversion of the ATM cell with a standard header into a cell with a compressed header is seen in FIG. 5A, where a 53-octet arrangement having a 4-octet header (following conventional discarding of the HEC octet) is illustrated at 1400, and its conversion into a 2-octet header is illustrated at 1401. The resulting savings in bandwidth of 4% is illustrated at 1402.

Figure 5B:
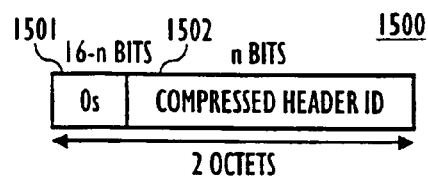

FIG. 5B illustrates the format of the compressed 2-octet portion 1500 of the header. As seen in the figure, the 16 bits that comprise the compressed 2-octet portion 1500 are divided into a first portion of all "0"'s and a second n-bit portion representing a header identifier (ID). The first portion has 16-n "zero" bits. The conversion of the 4-octets of header to the illustrated 2-octet code is performed readily by a look-up in a header compression table.

Figure 6A:
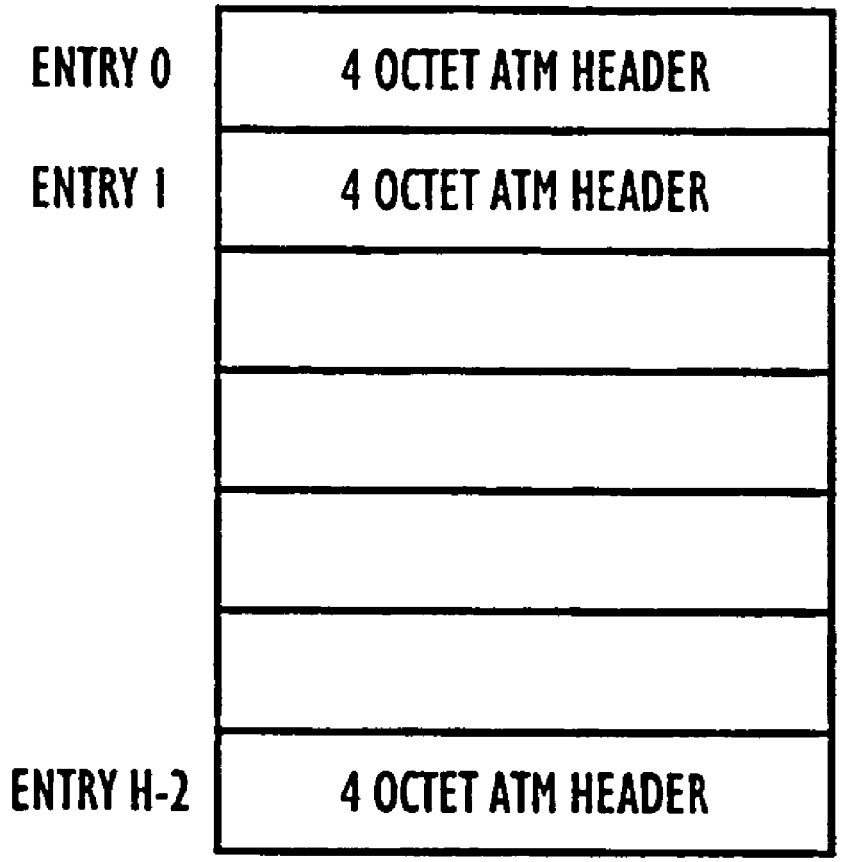
FIG. 6A shows a header compression table utilized in the present invention.

FIG. 6A illustrates the arrangement of the header compression table, which has H-1 entries(H=$2^n$, n<=16). Each entry in this table contains a 4-octet ATM header value. For every ATM cell that is to be transmitted on the WAN link, its 4-octet header is looked up in the compression table. This search requires an efficient technique to look-up a table entry based on its content. Hashing and tree look-up techniques are two schemes that are suitable for this kind of search. The 4-octet header of the cell is replaced by a 2-octet header, whose lower "n" bits contains the compressed header ID which is the index value into the compression table, where the entry was found. The value of "n" should be chosen depending on the expected number of different ATM header combinations and the amount of memory available to hold the compression table. Higher link rates generally imply that the link will carry a larger number of ATM virtual circuits, leading to a larger number of ATM header combinations and hence require larger values of "n". Values of "n" greater than 8 generally result in good performance over link rates up to 10s of megabits per second.

Once a compressed header is reunited with the corresponding data octets for a respective cell in the cell combiner 1350 in FIG. 4, the cell is forwarded to the cell multiplexer 1370, where the compressed cells are combined with the decompression table update cell (AHCUC), as subsequently detailed, and then on to other ALA units for buffering, encoding, framing and transmission via the link 25 to a receiving interface in another LAN.

Figure 6B:
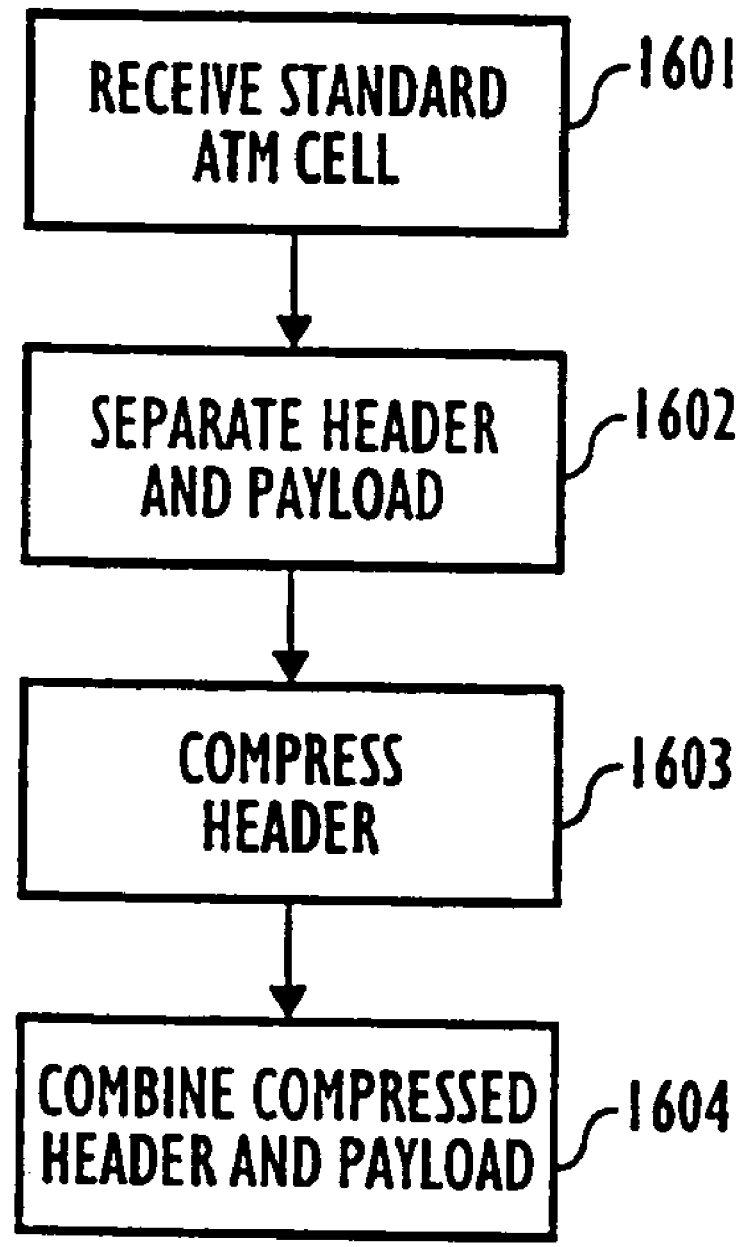
FIG. 6B illustrates a flow chart for implementing a header compression algorithm in accordance with the present invention.

FIG. 6B illustrates a flow chart for the steps taken in compressing standard ATM cells. In step 1601, the standard ATM cell is received by an ATM reception block and the HEC byte of the ATM cell header is discarded. The ATM physical protocol processor handles receive cell synchronization and ATM HEC processing functions, as well as the filtering and discarding of idle cells. In step 1602, the header and payload for each cell are separated and routed to a header compression or data compression function (not relevant hereto). In step 1603, the header for each cell is compressed in accordance with an applicable algorithm that is based on the content of a simple look-up table, which generates an index that is representative of the content of a portion of the header. The index and the remaining portion of the header are combined to provide the compressed header content. Finally, in step 1604, the compressed header and payload are combined to form a compressed ATM cell and the cell is then ready for further processing and assembly into a frame for transmission. Specifically, the cells are entered into the high- or low-priority queue depending on VC identification and user configuration options. Where compressed cells are assembled into packets, the packets enter the lowest priority queue.

At the receiver, an inverse process is undertaken and the received frames are demultiplexed so that the cells with compressed headers may be identified. With reference again to FIG. 2B, the received ATM transmission is entered into the serial interface 1050 and forwarded to de-interleaver RAM 1060, where individual frames are defined and then decoded by Reed-Solomon decoder 1070. The decoded frames are stored in Buffer RAM 1080 and finally processed by ATM Cell processor 1010 to restore the original ATM cell format.

Figure 7:
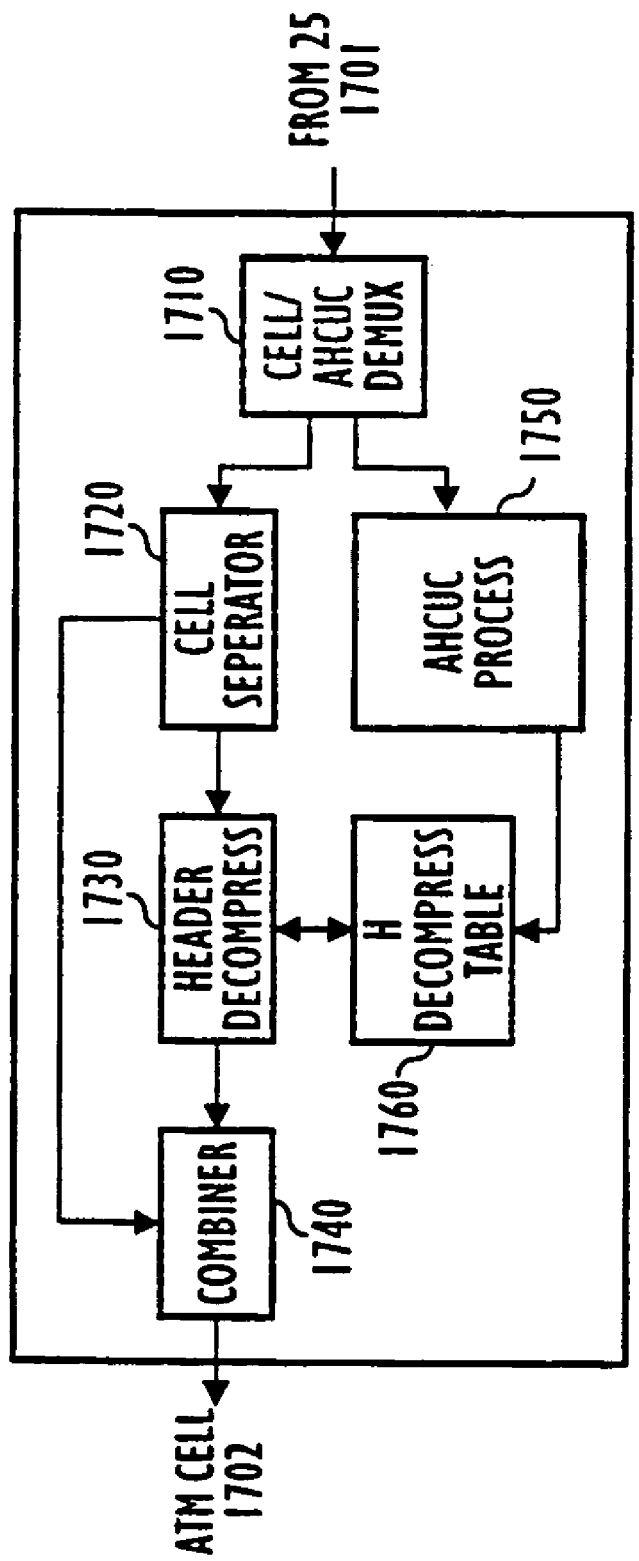
FIG. 7 shows a schematic illustration of circuit for decompressing an ATM cell header that was compressed in accordance with the present invention.
Figure 9:
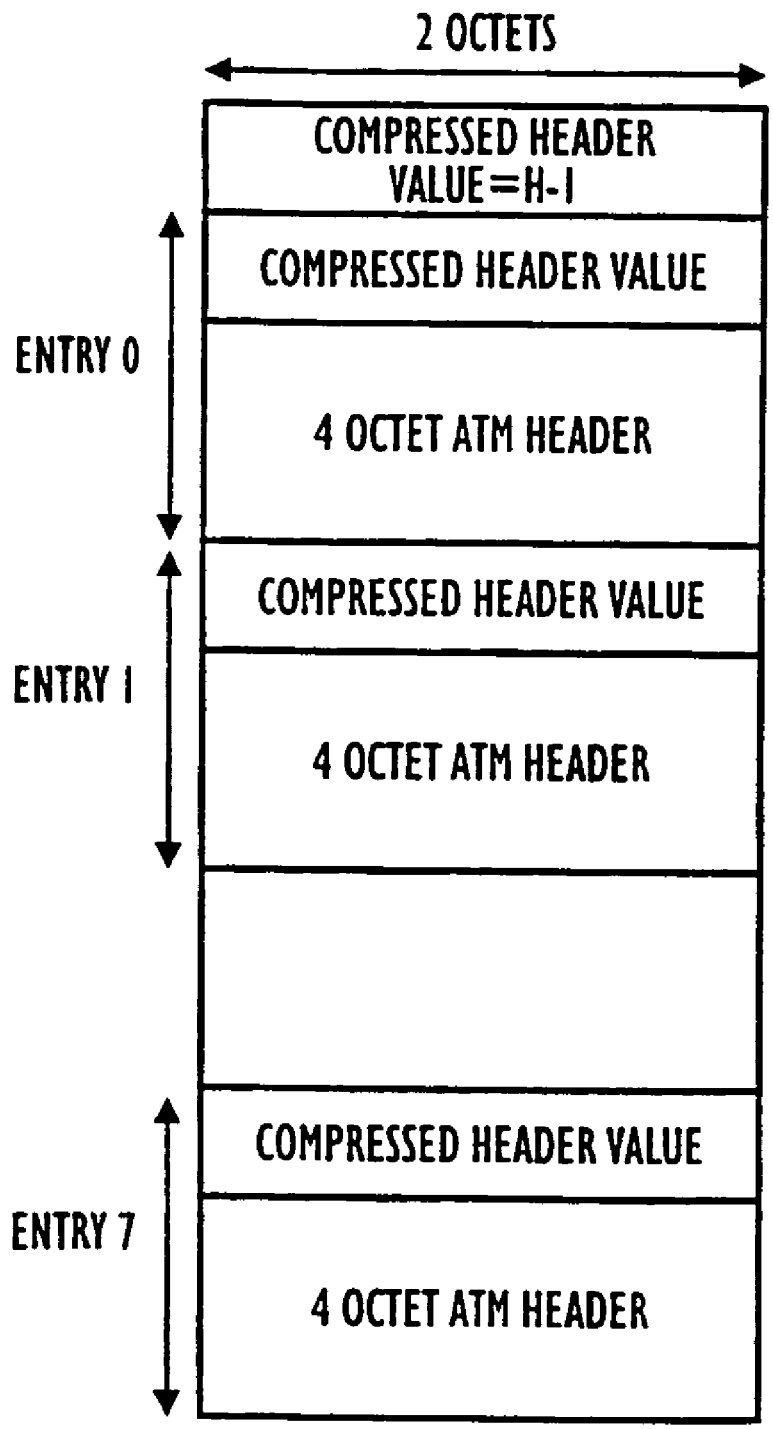
FIG. 9 shows a header compression update cell format as utilized in the present invention.

The portion of the ATM Cell processor that performs this function is the receiver interface as shown in FIG. 7. The combination of decompression table update cells (AHCUC) and compressed cells that were transmitted in frames on WAN link 25, following decoding and separation into individual cells, are received at input 1701 and are demultiplexed at the demultiplexer 1710, resulting in a stream of individual compressed cells and AHCUC cells. The compressed ATM cells are input to the cell separator 1720, which provides the data portion of the cells to a combiner 1740. The separator 1720 outputs each compressed header to a header decompression circuit 1730, which accesses the decompression lookup table 1760 and converts each 3 octet compressed header into the full 5 octet header. The AHCUC processor 1750 receives the AHCUC cell, as illustrated in FIG. 9, and updates the decompression lookup table 1760.

The compressed header portion is forwarded to a header decompressor 1730 which has access to a decompression table 1740. The 3-octet header is converted to a 5-octet header having a standard format as seen in FIG. 1A or 1B. The standard header is combined in combiner 1740 with the 48-octets of data in the ATM cell payload and then the combination is forwarded as a standard format ATM cell for further processing or switching.

Figure 8A:
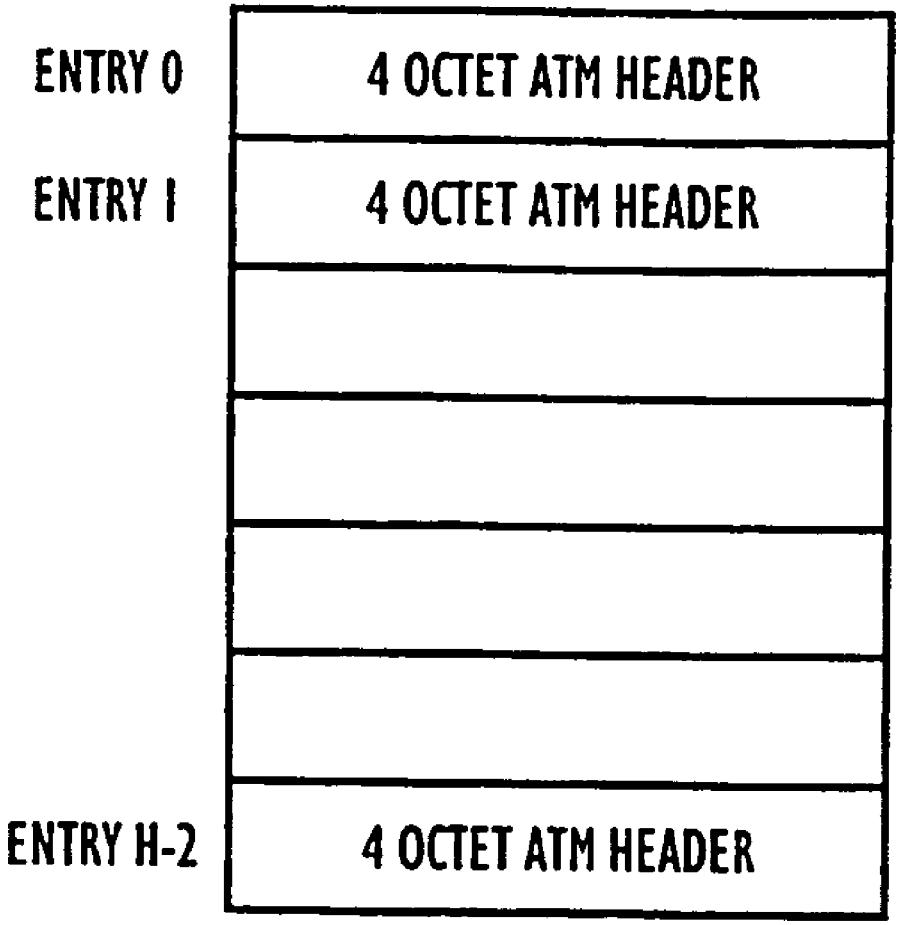
FIG. 8A shows a header decompression table utilized in the present invention.

Header decompression is performed by access to a header decompression table 1760 having H-1 entries (H=$2^n$, n<=16), as shown in FIG. 8A. Each entry in this table contains a 4-octet ATM Header value. For every ATM cell received over the WAN link with a compressed header, the n-bit compressed header ID, from the 2-octet compressed header field, is used as an index into the header decompression table and the 2-octet ATM cell header is replaced by the 4-octet contents of the table entry.

Figure 8B:
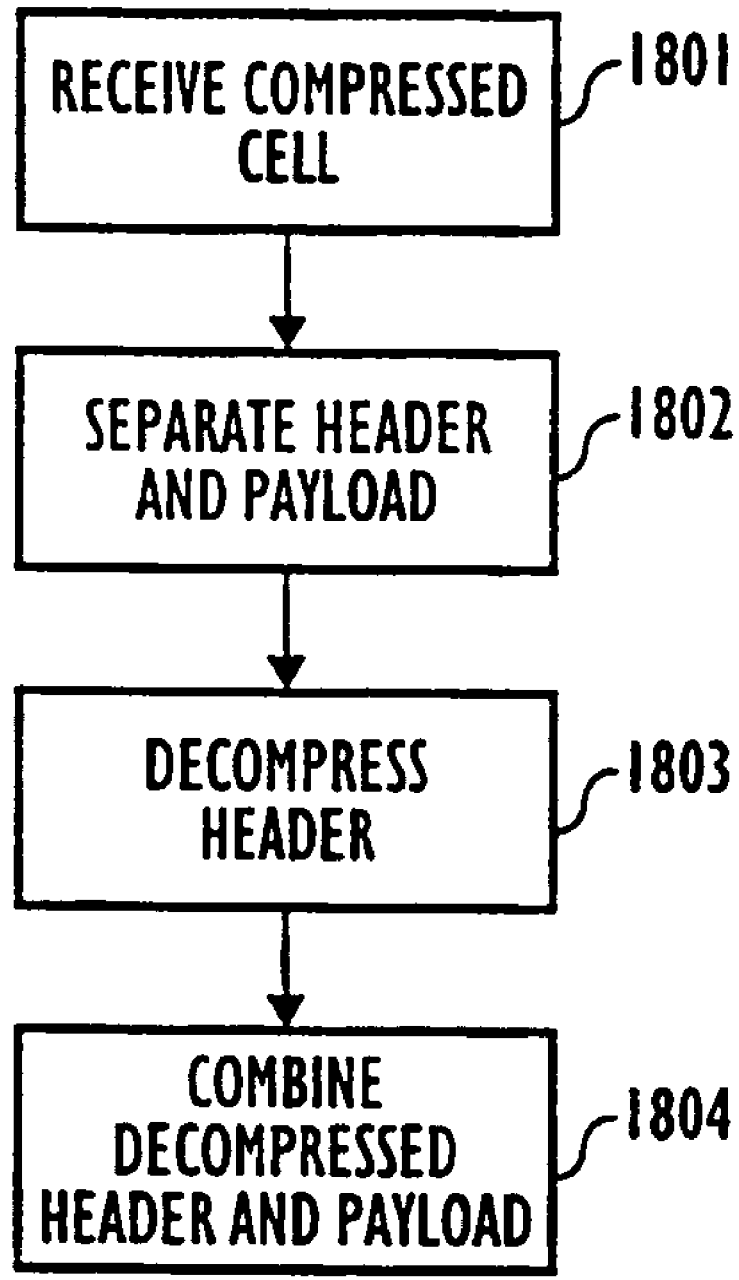
FIG. 8B illustrates a flow chart for implementing a header decompression algorithm in accordance with the present invention.

FIG. 8B illustrates a flow chart for the steps taken in decompressing the compressed ATM cells. In step 1801, the compressed ATM cell that is derived from the fixed-size frames is arranged in a queue and received. In step 1802, the compressed header and payload for each cell are separated. In step 1803, the header for each cell is decompressed in accordance with an applicable algorithm that is based on the content of another look-up table, which generates an original 4-octet signal in response to the transmitted index that was selected at the transmission ALA to be representative of the original content of a portion of the header. The original translated portion and the original transmitted portion of the header are combined to provide the original ATM cell header content. Finally, in step 1804, the original HEC-based header and payload are combined to form a standard ATM cell and the cell is then ready for further processing or switching.

The effectiveness of the lookup table for compression will require the table to have only the most current or frequently used 4-octet headers for conversion into an index value. If a 4-octet header portion is not found in the table, the table must be updated to provide the current conversion information, including index value and header portion. Thus, the contents of the header compression table in the ALA transmitter is built and maintained dynamically as cells are transmitted over the WAN link and the contents of the header decompression table is built and maintained dynamically based on receipt of AHCUC cells. Whenever a cell is to be transmitted on the WAN link and its 4-octet header value is not found in the compression table, a new entry is made for that header and the new entry must be identified for the decompression table at the receiver. If all H-1 entries have been assigned already, an existing entry is selected and its contents are overwritten by the 4-octet header of the ATM cell in question. This is not the only method of selecting an entry to be overwritten, for example, as alternative methods, one can select the least-recently-used entry, use a simple round-robin strategy of selecting the next available entry or simply select an entry randomly.

Once the new entry is made at the compression table, the new entry is conveyed to the far-end ALA using an ATM Header Compression Update Cell (AHCUC). The AHCUC is formatted as shown in FIG. 9. Each cell is 50 octets long; it contains the value H-1 in the first 2 octets followed by 8 entries. Each 6-octet entry consists of a 2-octet compressed header value and a 4-octet ATM header value. If an entry contains the value H-1 or greater in the first 2 octets, then that entry and subsequent entries in the AHCUC are ignored.

The AHCUC is created and sent ahead of the user cell. The first entry of the AHCUC contains the newly assigned compression table entry information. The other seven entries in the AHCUC are selected from the compression table based on a number of alternate selection methods. One can select entries that have been least-recently-updated or one can use a simple round-robin strategy of selecting the seven entries next to the one last sent via an AHCUC or one can send only one valid entry per AHCUC, by setting the compressed header value for the second entry to H-1.

Whenever an ALA receiver receives an AHCUC over the WAN link, it adds the entries from the AHCUC to its decompression table. If an entry already exists for a given compressed header ID, then the entry is overwritten. For each entry in the AHCUC, the n-bit compressed header ID in the first two octets is used as an index into the decompression table. The contents of the corresponding table entry is overwritten by the value in the next 4 octets of the AHCUC entry. If an AHCUC entry contains a value greater than or equal to H-1 in the compressed header ID field, then that entry and all subsequent entries in the AHCUC are ignored.

To protect against losses of AHCUC cells over the WAN link, compression table entries are periodically sent over the WAN link using AHCUCs. If a compression table entry has been used m times (i.e., m user data cells, whose 4-octet header matches the value in the entry, have been transmitted) since the last time the compression table entry was sent in an AHCUC, a new AHCUC cell is generated whose first entry is the compression table entry in question. The other seven entries in the AHCUC are selected based on the method described in the previous paragraph. The value m is set to minimum (64*i, 1024) after an entry is sent in an AHCUC for the ith time; i.e., m=64 after the first (initial) update is sent, m=128 after the second update is sent, and so on. This strategy ensures that a new entry is initially sent rapidly many times and less often once many copies of it have been sent. The amount of link bandwidth consumed by AHCUC updates is small.

While the above equation is one example for the selection of m, which works very well over a wide range of link conditions, other equations can be derived and used for the selection of m, which achieve similar results. Smaller values of the two constants 64 and 1024 should be used if the error rate on the link is very high.

In practice, the compression table and the decompression table should be initialized to empty values whenever a device that implements ALA-AHCA is powered up or reset. Similarly, whenever the transmission link state changes from "up" to "down" (as detected by some appropriate link monitoring function) the compression lookup table should be reset at the transmitter and the decompression lookup table should be reset at the receiver.

Figure 10A:
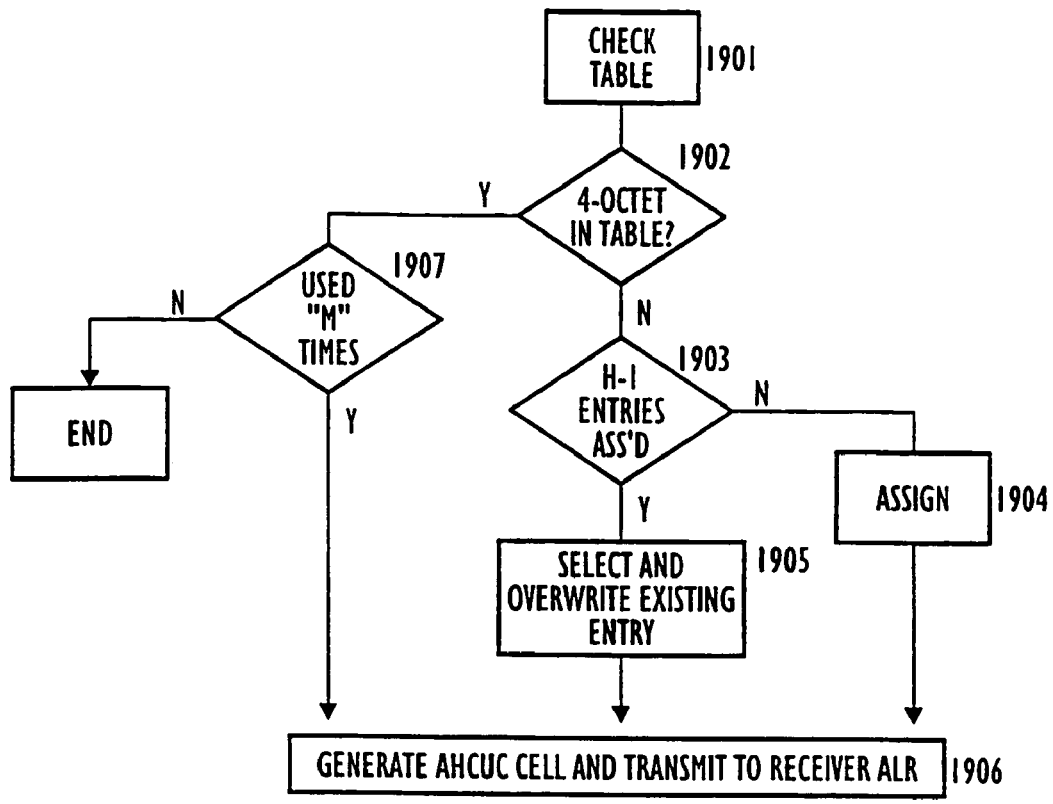
FIG. 10A illustrates a flow chart for implementing a header compression update cell generation algorithm in accordance with the present invention.

FIG. 10A illustrates a flow chart for implementing a header compression update cell generation algorithm in accordance with the present invention. Upon receipt of an ATM cell in step 1901, the compression lookup table is checked for the presence of the cell's 4-octet header in step 1902. In step-1903, if the 4-octet header is not in the table, a check is made of whether all H-1 entries have been assigned and if there has been no assignment, an entry is made in step 1904 and the AHCUC is sent to the receiving ALA in step 1906. If all H-1 entries have been assigned, one of the entries is selected according to any of a variety of algorithms and the existing entry is overwritten in step 1905, then the AHCUC is sent to the receiving ALA in step 1906. If it is determined in step 1902 that the 4-octet header is in the table, in step 1907 a check is made as to whether the entry has been used "m" times, where "m" is determined in any of a variety of ways as previously disclosed. If the entry has been used "m" times, the AHCUC is generated at step 1906 and is sent to the receiver ALA. If the use is less than "m" times, as determined in step 1907, the program ends.

Figure 10B:
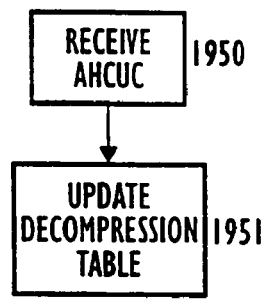
FIG. 10B illustrates a flow chart for implementing a header decompression update cell generation algorithm in accordance with the present invention.

FIG. 10B illustrates a flow chart for implementing a header decompression update cell generation algorithm in accordance with the present invention. The program simply involves the reception of the AHCUC in step 1950 and the updating of the decompression lookup table on the basis of the content of the cell in step 1951.

While the preferred embodiment teaches the compression of a 4-octet header portion into a 2-octet portion, the AHCA can be modified to compress 4-octet ATM headers into 1 octet. This can be accomplished by choosing $H=2^n$, where n<=8. This can be used effectively over links where the number of ATM Virtual Circuits in concurrent use is on the order of 64 to 128.

Furthermore, the AHCA scheme can be used with the value of parameter H selected such that H is not a power of 2. For example, H=1000 can be used. It also is possible to use n>8, but encode the compressed header in 1 octet or two octets, depending on whether the value of the compressed header is small (e.g., <128) or large by choosing a suitable encoding scheme. This increases the complexity of the system somewhat since the resultant compressed headers are of variable size. On the basis of the teachings herein, a scheme can be devised whereby low values of the compressed header are allocated to entries that get used more often.

Finally, while the preferred embodiment of the compression table and decompression table are shown as a linear array of entries in this description of ALA-AHCA, as would be understood by one of ordinary skill in the art, these tables can be implemented using other data structures that maintain the one-to-one relationship between the 4-byte header value and the unique n-bit compressed header ID value.

Figure 11A:
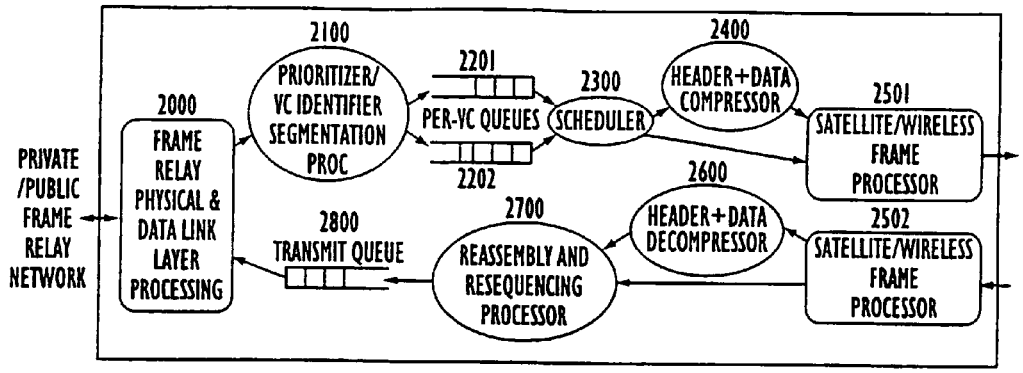
FIG. 11A illustrates a high level arrangement for a frame relay system.

FIG. 11A is a high level description of a frame relay system that performs frame relay processing to efficiently carry frame relay packets over wireless/satellite links. This system can perform the following:

Frame Relay processing at the Physical Layer and the Data Link Layer
Formatting of Data (variable length packets, segmentation and reassembly, resequencing)
Dynamic Forward Error Coding
Interleaving of frames (to spread the effect of burst errors)
Per-VC data compression
Prioritization and Scheduling
Header Compression In the high level description of the various functions performed in the system seen in FIG. 11A, to the left of the diagram is the private/public frame relay network and to the right is the satellite/wireless link.

The illustrated system uses a robust, flexible frame format between the 2 communicating terminals which allows the transport of several variable sized Spackets (segmented packets) in a frame and also to carry a single Spacket over several frames, whichever the case might be. Also, the frame format allows fast synchronization and the exchange of coding information. Each frame contains Reed-Solomon check bytes that are used for error correction and to enhance the quality of the satellite/wireless link. The number of RS check bytes in a frame can be changed on the fly, without any loss of data, to compensate for varying link conditions. The decision to change the RS check bytes in a frame is based on the constant monitoring of the link quality. Several frames are also interleaved before transmission over the satellite/wireless link, to help spread the effect of burst errors over several frames, all of which can then be corrected by the FEC in the frames. Also, Virtual Channels (VCs) can be configured to be enabled for data compression, which means that the Spackets belonging to the VC are to be passed through a data compressor/decompressor combination to save bandwidth. VCs can also be configured to be either high or low priority VCs and the scheduler then, uses this information to fairly transmit the various Spackets over the satellite/wireless link.

In operation, a private or public frame relay network provides the frame relay packets to the frame relay physical and data link layer processing block 2000; where they are received and processed as specified in ITU recommendation Q.922 (Link Access Procedures for Frame Relay). The physical layer processing is similar to the processing of any HDLC data stream. This is the processing performed in most Frame Relay Access Devices (FRADs).

A frame relay packet received from the terrestrial network consists of payload data and a CRC field, and flags at the beginning and the end of the frame. The frame relay processing removes the flags and the CRC fields and transports only the payload section of the frame relay packet over the satellite link. The CRC and the flag information is regenerated at the receiving terminal and added to the packet before it is transmitted to the receive side terrestrial network.

Figure 11B:
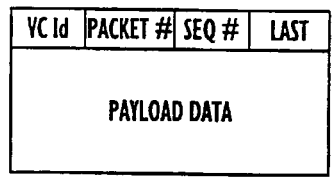
FIG. 11B illustrates a satellite/wireless frame structure that is applicable to a frame relay system.

In prioritizer/VC identifier/Segmentation processor 2100, the variable length frame relay packets are segmented into several smaller packets called Spackets. The Spackets allow efficient scheduling of packets belonging to multiple priorities and loss less data compression. FIG. 11B illustrates the various fields in a Spacket, whose content provides for efficient processing of the Spackets, as subsequently described.

In order to avoid an intolerable delay of high priority packets (e.g., audio and video) due to processing and transmission of low priority packets, Spackets belonging to a high priority packet could be transferred after a single Spacket from a low priority packet has been transferred, thus minimizing the delay variance that the high priority packet experiences. This technique minimizes the delay variance significantly and the satellite/wireless network performance is better than terrestrial networks, as far as delay variance is concerned. Thus, when each frame relay packet is segmented into one or more Spackets, all but the last Spacket are n bytes long. The last Spacket could also be n bytes long if the frame relay packet, to begin with, was of a length which was an integral multiple of n. A Spacket is then prepended with a header as shown in FIG. 11B that contains a Virtual Channel (VC) Identifier for the channel to which the packet belongs. Also, the header is supplied with the packet and the sequence numbers. The packet number increments for each new frame relay packet. The sequence number increments for each Spacket within the frame relay packet. Information about the priority of the packets and whether or not the packets are compressed is maintained locally. All this information is used to perform segmentation/reassembly, data compression/decompression, prioritization and scheduling. The "last field" indicates whether or not the Spacket is the last Spacket for the frame relay packet. If it is, then at the receiving terminal, the frame relay packet can be reassembled and transmitted over the terrestrial link.

The sizes of the various fields can be left to the discretion of the system designer. The VC Id field would either be the size of the entire VC field in the frame relay packet or could be the size specified in the header compression parameters. The size of the Packet number and Sequence number are also left to the system designer. The "last field" is a single bit. The size of the payload is determined by a trade-off between the overheads and the performance of the system. If the payload size is very low, the overheads will be very high, but the delay variance performance of the system will be very good. If the payload size is set to a large value, then the delay variance performance will be poorer but the overheads will be lower. Hence, the sizes would depend on the overheads the designer is prepared to allow, and the performance specifications of the system.

Next, queues of Spackets belonging to different VCs are stored for use by the scheduler in Per-VC or priority queues 2201 and 2202. In the case of a priority queue, high priority queues 2201 and low priority queues 2201 are maintained and the cells in each priority queue are transmitted on a FIFO basis. A more preferable mode of queuing is to have a queue for each VC, which is designated to have a high or low priority, and then store the cells belonging to each VC in its corresponding queue. Cells in these per-VC queues are also transmitted on a FIFO basis to preserve sequence integrity.

A scheduler 2300 sends Spackets belonging to various priorities or VCs over the satellite link. The scheduler is designed to be fair to VCs within a priority and between priorities as well. If the Spacket is to be compressed then it is sent to the Data Compressor 2400. The scheduler 2300 uses all the priority information for the various VCs and tries to be fair in the scheduling of the Spackets. A simple scheduling algorithm is to process all the high priority per-VC queues on a round-robin basis and then to process all the low priority per-VC queues on a round-robin basis. Another option for the scheduler would be to transmit at least one low priority cell every "n" high priority cells. This could assure some degree of fairness between priorities. A further option would be, within a priority, to use a weighted round-robin scheduling algorithm to transmit cells from per-VC queues, the weights reflecting the bandwidths that the VCs have subscribed for. This scheduling algorithm will attempt to schedule different VCs fairly.

Spackets which belong to a VC which has been specified to be compressed are compressed in data compressor 2400. To achieve loss-less data compression, the compression and decompression histories are reset every n Spackets, where n is a configurable parameter. With the FEC, the link is maintained at a very low BER. If a Spacket does get corrupted, then the resetting of the histories, will ensure that not more than n Spackets are affected.

Figure 11C:
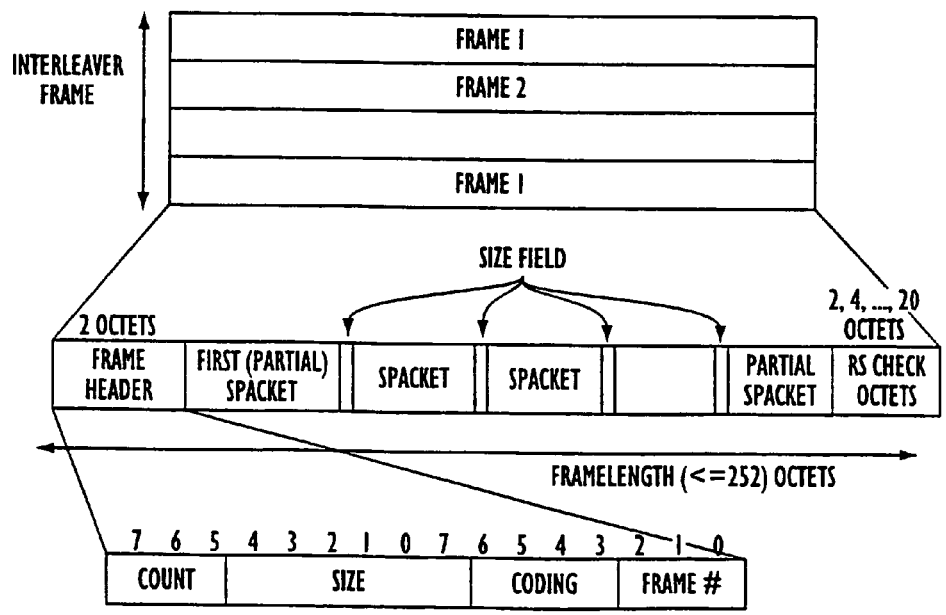
FIG. 11C illustrates the fields in a Spacket used in a frame relay system.

Finally, the compressed or uncompressed Spackets are provided to a satellite/wireless frame processor 2501, which incorporates the Spackets into a frame for transmission over the satellite/wireless link. This frame structure has been designed to facilitate fast frame synchronization, accommodation of several variable-size packets, fast recovery from lost frames, very low bandwidth overhead, as well as dynamic Reed-Solomon coding change without introducing data loss during the coding rate change transition. FIG. 11C shows the frame format.

The fundamental unit of transmission over the satellite/wireless link is a fixed size frame, which is n octets long. If an interleaving depth of I is used, then I such frames are used to compose an "interleaver frame". The interleaver rearranges the order of the bytes in the interleaver frame and transmits each byte sequentially over the satellite/wireless link. It should be noted that there are no special synchronization bits in this frame structure.

Each frame is n bytes long and consists of:
a 2-octet header
followed by the frame payload, and
terminated by 2t octets (t>0) of Reed-Solomon coding check bytes in the end.

TABLE 1

| | |
|---|---|
| Count0 | Number of Spackets in frame. Does not include the first Spacket, if any Includes the last Spacket, if any |
| Size0 | Size of first partial Spacket in frame divided by 4. |
| FrameNum | The frame number Each frame is sequentially numbered 0, 1, . . . , 7, 0, . . . |
| Coding | If FrameNum >3, the coding field represents the number of Reed-Solomon octets/2 that will be used starting with the next frame numbered 0. Note that 0 is an invalid value for the coding field. |

TABLE 1-continued

| |
|---|
| If FrameNum == 0, the coding field represents the suggested value of the number of Reed-Solomon octets/2 that the other side should use for its own transmission. If the coding field value is 0xF, the value implies that the transmitting terminal is not yet synchronized to its receiving bit stream. Note that 0 is an invalid value for the coding field. |
| If FrameNum == 1, the least significant bit of the coding field is 1 if Spacket header compression is activated at the transmitting terminal, 0 otherwise. Other bits of the field are reserved for future use. |
| If FrameNum is 2 or 3, the coding field shall be set to 0's. |

The payload contains a combination of several variable-size packets (the packets may contain compressed or uncompressed Spackets).

The rules for filling a frame payload with Spackets are as follows:

1. If the previously transmitted frame contained a partial Spacket at the end of the payload, the frame payload currently being transmitted begins with the next portion of that Spacket. This portion shall consume min (4*size0, payload_size) octets of the payload, where size0 0. The actual size of this partial Spacket may be up to three octets less than 4 * size0, in which case the extra octets shall be filled with zeroes.

2. After the initial partial Spacket segment, the payload contains count0 Spackets where count0 0. If the last Spacket cannot be entirely contained in the payload, then only its initial portion is included in the payload. Each Spacket is preceded by a 1-octet-length (in octets) field followed by the Spacket contents. The length field contains the size of the Spacket in bytes.

3. If there are any octets left over in the payload, then the first such unused octet shall contain a zero. The rest of the octets, if any, shall be filled sequentially with the numbers i, i+1, i+2, . . . , where i is the octet number of the first such octet in the payload (octets in the payload are implicitly numbered 0, 1, . . . ).

From these rules, one can see that a frame payload may contain several Spackets and that the Spackets can be transmitted over more than one frame. A frame with no Spackets contains the sequence 0, 1, 2, . . . in the payload. A Spacket may be split across more than two frames if required.

This frame structure design allows the possibility of dynamically changing the Reed-Solomon code size by correspondingly changing the payload size but keeping the frame size constant. If the receiver "loses" a frame, for example, due to excessive bit errors in the frame, the size0 field allows rapid determination of the Spacket boundary on the very next frame. The frame header, shown in FIG. 11C, has four fields which are described in Table 1, wherein the Reed-Solomon check-bytes are the check-bytes generated by a standard Reed-Solomon algorithm with frame size=N bytes and number of check bytes=2t.

During the time that the system has not achieved receive synchronization, it sets the Reed-Solomon code value of its receiver and its transmitter to the maximum value. After the system achieves receive synchronization and it detects that the remote terminal has also achieved receive synchronization (i.e., the coding field in the received frame header of frame number 0 contains a valid code value), it activates an adaptive coding algorithm.

Transmissions from the satellite/wireless network are received and processed by a Satellite/Wireless frame processor 2502, which performs the inverse operation of that performed by the frame processor 2501, strips the Spackets from the frame format and produces the compressed and un-compressed Spackets.

Next, compressed Spackets are sent to Data Decompression module 2600, which decompresses the Spackets belonging to a VC which has been configured to be compressed. Compression and decompression histories are maintained in the Data compressor 2400 and the decompressor 2600, respectively. These histories are reset once every n Spackets, where n is a configurable parameter. This is done to minimize the effect that a lost or erroneous Spacket has on the following Spackets.

A reassembly and resequencing processor 2700 keeps track of Spackets belonging to all the VCs. The reassembly algorithm works on a per-VC basis. The Spackets for each VC are resequenced based on the sequence and packet numbers. The following rules are used to reassemble frame relay packets:

If a Spacket with a sequence number of zero is received, discard any previous incompletely assembled frame relay packet and start reassembling this new packet.

If a Spacket with the same packet number and VC Id, with a sequence number one more than the previous Spacket is received, then append this Spacket to the partially reassembled frame relay packet. If the "last field" indicates that the Spacket is the last Spacket of a frame relay packet, the frame relay packet has been completely assembled.

If a Spacket with sequence number which is out of sequence, and non-zero, is received, discard this new Spacket and any partially reassembled frame relay packet.

If the packet number of the Spacket received is not the same as that of the previous Spacket and the sequence number of the received Spacket is not zero, discard this new Spacket and any partially reassembled frame relay packet.

Optionally, a length field could be added to the frame relay packet at the transmitting terminal before it is segmented and transmitted over the satellite/wireless link. This length field could be used at the receiving terminal to check if the frame relay packet has been reassembled properly. If it hasn't then the frame relay packet is added to the transmit queue.

A transmit queue 2800 contains frame relay packets received from the remote terminal which will be transmitted over the terrestrial link. These packets are processed by the frame relay physical and data link layer processing module and transmitted over the terrestrial link. Finally, the frame relay physical and data link layer processing module 2000 will reassemble the Spackets in to the appropriate frame relay configuration for transmission over the private or public network.

In order to save bandwidth, a header compression technique, similar to that used for ATM transmissions as described previously, may be used to compress the VC Id of a frame relay packet into a smaller value. This technique utilizes the fact that the number of VCs carried over the satellite/wireless link is not very large and can be compressed to a much smaller VC Id space. If header compression has been enabled in the system, then the VCs are mapped into a new value as specified by the size of the compressed VC field. This header compression information is periodically exchanged between the communicating terminals. Also, every time a new mapping is created, this information is asynchronously exchanged between the terminals before the actual transfer of the mapped packet begins.

As to frame relay, Internet or other cell/packet based formats, any one or more of a variety of header fields can be compressed using the techniques disclosed herein, thereby providing valuable bandwidth efficiencies for satellite/wireless transmissions. In each of these cases, the basic idea is to identify those bytes that do not change very much and utilize this redundancy factor to provide greater transmission efficiency. The compression and decompression of the Internet cell/packet would implement these same techniques with equipment substantially as disclosed in FIG. 4, but for the fact that the cell/packet may have a variable size, as in the frame relay case previously described with respect to FIG. 11A. In this regard, the compression and decompression of the header fields would be implemented in a header/data compressor comparable to compressor 2400 and header/data decompressor comparable to decompressor 2600 in FIG. 11A. The modifications needed to accommodate each of the frame relay and Internet formats would be known to one of ordinary skill without the need for undue experimentation. Similarly, the transmission of the compression and decompression table entries would be accomplished by techniques already described for the preferred ATM embodiment disclosed herein.

Although certain preferred embodiments of the present invention have been described, the spirit and scope of the invention is not restricted to that which is described above and it is the claims which are relied upon to define the present invention in accordance with applicable principles of law.

What is claimed is:

1. An apparatus for a satellite/wireless communication system for transmitting information in a plurality of cell/packets, said system comprising at least two local area networks that are connected by a satellite/wireless communication link, said apparatus comprising:
  (i) means for discriminating each cell/packet in said plurality of cell/packets;
  (ii) means for detecting a header in each of said cell/packets and for separating said header from payload;
  (iii) means for compressing said separated header using a look up table; and
  (iv) means for combining said compressed header with said payload to form compressed header cell/packets;
  (v) means for discriminating each compressed header cell/packet in said plurality of compressed header cell/packets;
  (vi) means for detecting a header in each of said compressed header cell/packets and for separating said header from payload;
  (vii) means for decompressing said separated header; and
  (viii) means for combining said decompressed header with said payload to form cell/packets;
  wherein said means for compressing and said means for decompressing comprises means for correlating original header and transmitted compressed header information, and
  said apparatus further comprising means for transmitting via said satellite/wireless communication link from a transmitting location, comprising means (i)–(iv), to a receiving location, comprising means (v)–(viii), information for correlating original header and transmitted header information.

2. A communication system as set forth in claim 1, wherein said cell/packets comprise ATM cells.

3. A communication system as set forth in claim 1, wherein said cell/packets comprise frame relay packets.

4. A communication system as set forth in claim 1, wherein said cell/packets comprise at least one of ATM cells and frame relay packets.

5. An apparatus for an frame relay wireless communication system, said system comprising at least two local area networks that are connected by a satellite/wireless communication link, said apparatus comprising:
   (i) means for generating a one or more Spackets for each frame relay packet cell used for conveying payload information;
   (ii) means for detecting a header in each of said Spackets and for separating said header from payload;
   (iii) means for compressing said separated header using a look up table; and
   (iv) means for combining said compressed header with said payload to form compressed header cells;
   (v) means for discriminating each compressed header cell in said plurality of compressed header cells;
   (vi) means for detecting a header in each of said compressed header cells and for separating said header from payload;
   (vii) means for decompressing said separated header; and
   (viii) means for combining said decompressed header with said payload to form Spackets,
   said apparatus further comprising means for transmitting via said satellite/wireless communication link from a transmitting location, comprising means (i)–(iv), to a receiving location, comprising means (v)–(viii), information for correlating original header and transmitted header information.

6. An apparatus for a frame relay wireless communication system as set forth in claim 5, wherein said means for compressing and said means for decompressing comprises means for correlating original header and transmitted compressed header information.

7. An apparatus for a frame relay wireless communication system as set forth in claim 5, further comprising means for assembling a plurality of Spackets into a frame relay packet.

8. A method of communicating cell/packets, each comprising a header portion and a payload portion, in a modified frame format for a communication system, said system comprising at least two local area networks that are connected by a satellite/wireless communication link, comprising:
   (a) separating said header portion and said payload portion for each cell/packet:
   (b) identifying N of M header octets in said header;
   (c) compressing said N header octets into L octets using a look up table;
   (d) combining said L octets with said payload portion;
   (e) transmitting said combined L octets and payload portion within a frame;
   (f) receiving said frame;
   (g) separating said L octets from said payload;
   (h) decompressing said L octets into N header octets;
   (i) generating M header octets from said N header octets; and
   (j) combining said M header octets with said payload portion to create a cell/packet
   wherein said transmission step further comprises generating an input entry for a compression table and generating an entry for a decompression table and transmitting said decompression table entry for input into said decompression table via said satellite/wireless communication link.

9. The method of claim 8 wherein said compressing step further comprises:
   comparing said N header octets to the content of a header compression table containing index values.

10. The method of claim 9 wherein said comparing step comprises at least one of hashing and table look-up techniques.

11. The method of claim 8 wherein said decompressing step further comprises:
   comparing said L octets to the content of a header decompression table containing N header octets.

12. The method of claim 11 wherein said comparing step comprises at least one of hashing and table look-up techniques.

13. The method of claim 8 wherein said header comprises a HEC-based header.

14. The method of claim 8 wherein said header decompression table has H-1 entries, wherein H=2n, wherein n<=16.

15. The method as recited in claim 8 wherein said entry is transmitted in a cell.

16. The method as recited in claim 15 wherein said entry is created and sent ahead of a user cell.

17. An apparatus for an Internet satellite/wireless communication system, said system comprising at least two local area networks that are connected by a satellite/wireless communication link, said apparatus comprising:
   (i) a generator for generating a one or more Internet cell/packets for conveying payload information;
   (ii) a header detector operable to detect a header in each of said packets and for separating said header from payload;
   (iii) a compressor for compressing said separated header using a look up table; and
   (iv) a combining unit for combining said compressed header with said payload to form compressed header cell/packets;
   (v) a discriminator for discriminating each compressed header cell in said plurality of compressed header cell/packets;
   (vi) a header detector for detecting a header in each of said compressed header cell/packets and for separating said header from payload;
   (vii) a decompressor for decompressing said separated header; and
   (viii) a combining unit for combining said decompressed header with said payload to form packets,
   said apparatus further comprising means for transmitting via said satellite/wireless communication link from a transmitting location, comprising apparatus (i)–(iv), to a receiving location comprising apparatus (v)–(viii), information for correlating original header and transmitted header information.

18. An apparatus for a frame relay wireless communication system as set forth in claim 17, wherein said compressor and said decompressor comprises means for correlating original header and transmitted compressed header information.

* * * * *